United States Patent

Beneze

[15] 3,686,389
[45] Aug. 22, 1972

[54] METHOD OF MAKING A PNEUMATIC TIRE

[72] Inventor: Heinz Wilhelm Beneze, Akron, Ohio

[73] Assignee: The Firestone Tire & Rubber Company, Akron, Ohio

[22] Filed: May 20, 1970

[21] Appl. No.: 39,948

[52] U.S. Cl. .................................. 264/250, 264/261
[51] Int. Cl. .............................................. B29h 17/00
[58] Field of Search......264/311, 250, 261; 18/2 TM, 18/17 T, 17 K, 17 W, 26 RR, 42 T; 25/30 C

[56] References Cited

UNITED STATES PATENTS 3,505,437    4/1970    Eichmann et al. ..........269/261
3,529,054    9/1970    Hepney .....................264/261

Primary Examiner—Robert F. White
Assistant Examiner—J. R. Hall
Attorney—S. M. Clark and Gordon B. Seward

[57] ABSTRACT

A method of making a pneumatic tire which includes the steps of separately forming first and second sidewall members and thereafter placing or locating two of the sidewall members in a centrifugal casting mold. As located in the centrifugal casting mold, the sidewall members are spaced from each other in the tread area of the finished tire. The two sidewall members are connected together by centrifugally casting a connecting material into the space between the two sidewall members and the material which forms the connection is compatible with the material of construction of the sidewall members.

2 Claims, 4 Drawing Figures

3,686,389

METHOD OF MAKING A PNEUMATIC TIRE

The prior art has produced centrifugally cast pneumatic tires from polyurethane and similar materials. In order to produce such tires, it has been necessary to utilize a mold with a segmented core (usually constructed of metal) in order to be able to remove the core from the finished tire. The removal of such a core is still difficult and inconvenient.

Additional disadvantages of such constructions is that they are extremely heavy and expensive and they are not conducive to high production which is a present day economic requirement.

It is therefore an object of this invention to provide a method and construction for producing tires by the centrifugal casting method which does away with the necessity of utilizing a core and particularly a segmented core within the mold.

Another object is to provide a method of making a pneumatic tire which includes separately casting the sidewalls of the tire which include bead portions and which may or may not include tread portions and then locating two of the sidewalls in a centrifugal mold without a core with the two sidewalls being spaced from each other, and thereafter connecting the separated sidewalls by centrifugally casting a material into the space, which material is compatible with and connects to the material of the two sidewalls.

Figure 1:
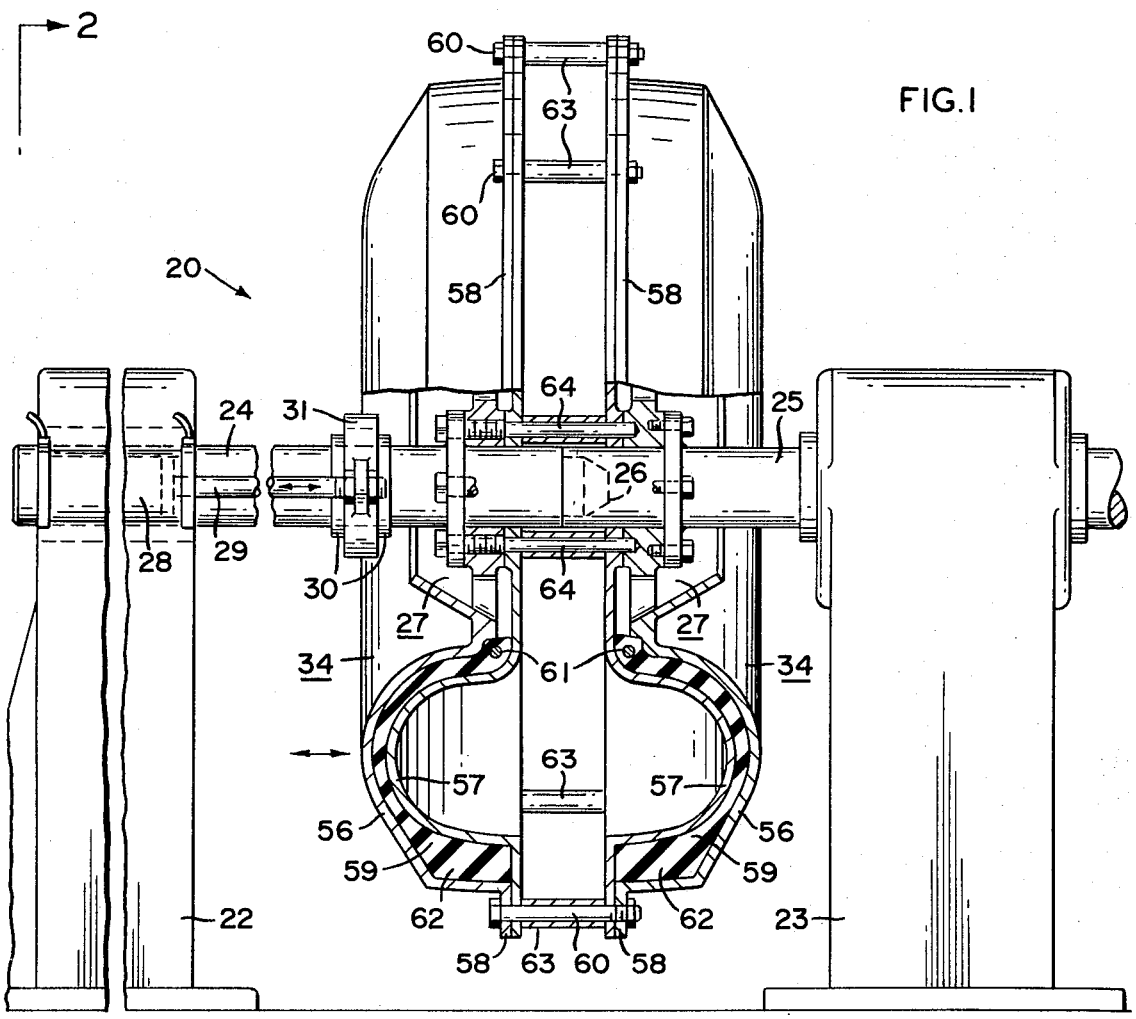
FIG. 1 is a view partially in cross section of an apparatus and double mold for centrifugally casting two separate sidewalls.
Figure 2:
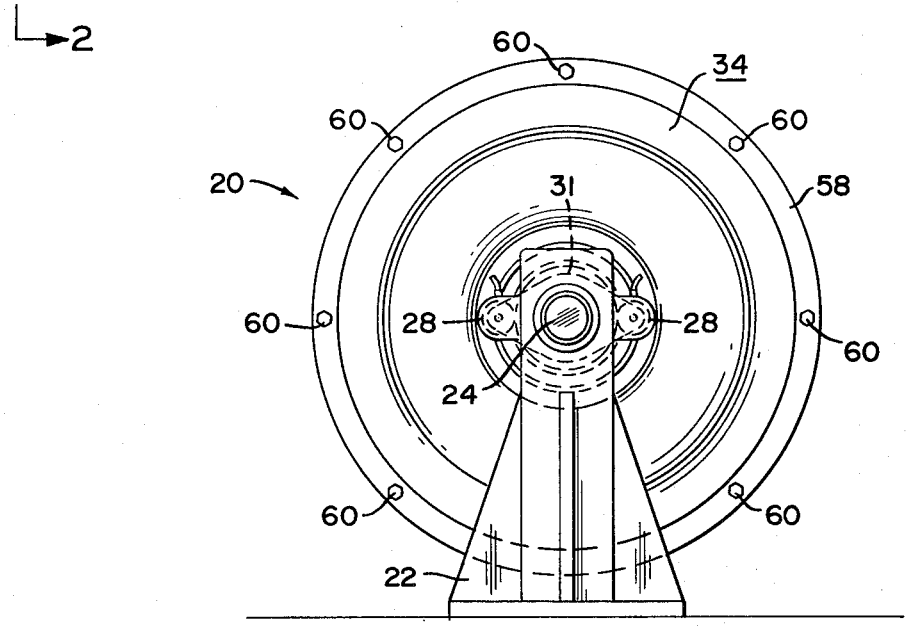
FIG. 2 is a view taken generally along the line 2—2 of FIG. 1.

An apparatus 20 for centrifugally casting two separate sidewalls and which includes pedestals 22 and 23 which rotatably mount shafts 24 and 25 respectively. Pedestal 23 includes motive power means which are not shown for rotatively driving the entire apparatus 20. The two shafts 24 and 25 fit together at their ends by means of a guide portion 26 on shaft 24 which fits into a corresponding axial opening in the end of shaft 25. Shaft 24 is not only journalled for rotation in pedestal 22 but is also capable of axial movement to the left from the position shown in FIG. 1 and of course return movement. This is accomplished by means of two air cylinders 28 which move drive rods 29 which in turn are connected to a bearing member 31. Bearing member 29 fits between two collars 30 which are fixedly secured to shaft 24. This apparatus serves to rotate sidewall molds, two of which are shown in FIG. 1 and both are identified by the reference number 34. Since molds 34 are similar in construction only one will be described and where the parts are the same, the same reference numerals will be applied.

As seen the sidewall mold comprises what will be referred to herein as an outer contour portion 56 and an inner contour portion 57 sometimes hereinafter referred to as a thin wall disk. The outer contour portion 56 terminates in a flange 58 and the thin wall disks 57 of the two molds are suitably secured in position by means of bolts 60 which extend through spacers 63. Guide pins 64 are utilized to properly align and position the sidewall molds.

In order to form the separate sidewall which is identified generally by the reference numeral 59, the sidewall molds 34 are suitably attached to the shafts 24 and 25 as shown and with the parts in the position shown in FIG. 1, the sidewall molds are driven at a rotative speed for example in the range of 700 to 1,000 revolutions per minute. Beads 61 are previously secured in position in the sidewall molds in any suitable manner and a suitable liquid resinous material is introduced into the sidewall molds through the area 27 in a manner appreciated by those skilled in the art and which is not important for a proper understanding of the present invention. Prior to the above described steps the inner surface of the thin wall disk 57 is provided with a liquid release agent for a purpose which will be described and which will be more fully appreciated hereinafter. Introduction of the resinous material through area 27 and continued rotation of the sidewall molds causes the resinous material to travel outwardly by the action of centrifugal force to assume the position shown in FIG. 1 to form the separate sidewalls 59 which includes the previously described bead portions 61 as well as a tread portions 62.

Figure 3:
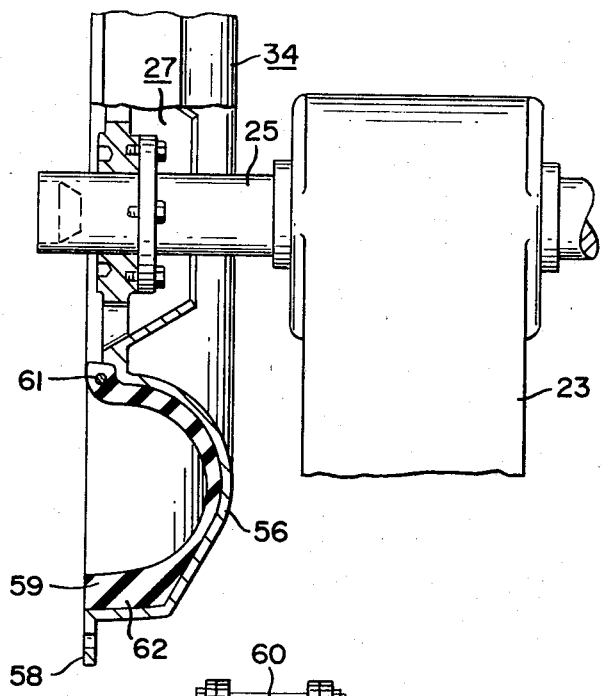
FIG. 3 is a fragmentary view of a portion of the structure shown in FIG. 1 with the closing disk which closes one of the separate sidewall molds removed; and, FIG. 4 is a cross-sectional view of the final centrifugal casting mold used in completing the pneumatic tire.

After the sidewalls 59 have been formed as hereinabove described, the sidewall molds 34 may be conveniently separated by removing the bolts 60 and spacers 63 and actuating air cylinders 28 to move shaft 24 and its attached mold 34 to the left from the position shown in FIG. 1. Use of the release agent on the inner surface of the thin wall disks 57 results in ease of removal of the thin wall disks and the lack of a release agent on the inner surface of portions 56 of the sidewall molds causes the finished sidewalls 59 to remain in or secured to the portion 56 of the sidewall molds. FIG. 3 shows one of the sidewall molds 34 with the thin wall disk 57 removed.

Figure 4:
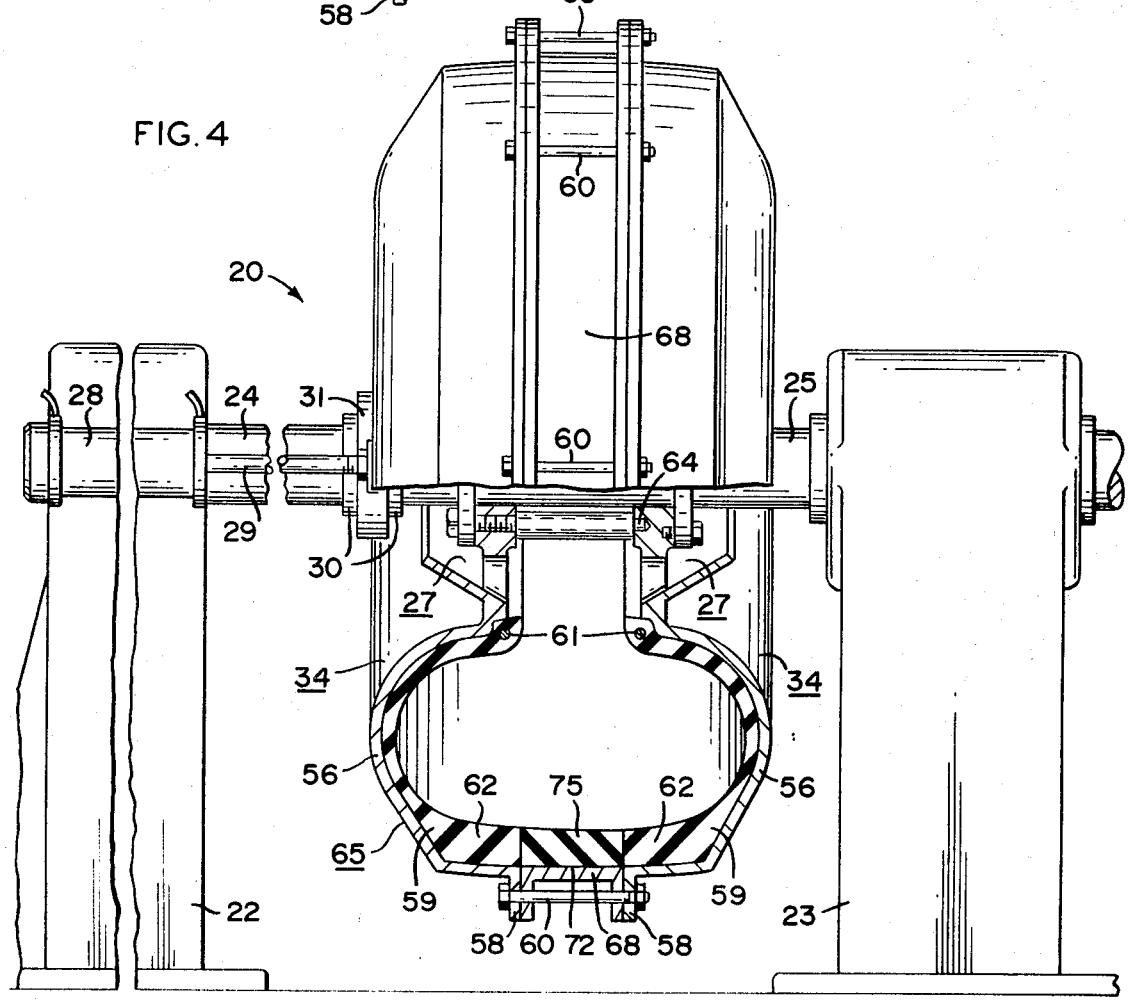

The final step in constructing the finished pneumatic tire is best understood by specifically referring to FIG. 4 of the drawings. The finished centrifugal casting mold is identified by the reference numeral 65 and comprises two of the sidewall molds 34 suitably connected together by means of a connecting flange 68 appropriately secured by the bolts 60 to the flanges 58 of the sidewall molds 34. The mold 65 is readily made up by placing flange 68 in position and bringing shaft 24 with attached sidewall mold back to the right from the position described above after removal of spacers 63.

It will thus be seen that the two sidewall molds 34 connected together in this fashion results in a space 72 between the two formed sidewalls 59 and it is by this means that the two sidewalls 29 are subsequently joined together. The finish centrifugal casting mold 65 is rotated in the same manner as the sidewall molds 34 described in conjunction with FIG. 1 and a liquid resinous material sufficient to fill the space 72 is introduced into the interior of mold 65. Because of the action of centrifugal force the liquid resinous material travels to space 72 and when the appropriate amount of material is utilized, it sufficiently fills the space 72 as shown. This material is identified by the numeral 75. The material of the connecting strip 75 is preferably the same material from which the sidewalls are constructed and as a result the finished product is an integral one piece construction. Rotation of the mold 65 may be at about the same rotational speed as described in conjunction with FIG. 1, for example on the order of 700 to 1,000 revolutions per minute. After the resinous material has cured or set up at least partially, the finished tire may be removed from the mold 65 by appropriately unfastening the bolts 60 and moving shaft 24 and connected mold 34 to the left as viewed in FIG. 4. The tire is removed from the other mold 34 and flange 68 is removed. The finished tire may be subjected to subsequent or post-curing as may be necessary.

Those skilled in the art will appreciate that the spacers 63 and bolts 60 may be replaced by some equivalent mechanical means which would result in a somewhat faster means of assembly and disassembly and the present embodiment should be construed as only one satisfactory structure for carrying out the present invention.

The resinous materials which are capable of being utilized in accordance with the teachings of the present invention are practically unlimited, the principal consideration being that the resin, whatever its nature, be a liquid prior to curing. The resin must be curable and may be cured by heat, by addition of a cross-linking agent, or by catalyst, by condensation, by chemical reaction, or any combination thereof. Tires constructed in accordance with the teachings of this invention are preferably constructed with what are commonly referred to as polyurethane resins. For the most part these are of the polyether type; however, polyester-type urethanes may also be used for this purpose. The composition of these materials are well known and reference may be had for example to U.S. Pat. Nos. 2,852,483 and 2,814,605 and 2,814,606 for specific examples of polyether-polyurethanes and polyester-polyurethanes. These materials are readily available commercially as prepolymers having a viscosity comparable to that of honey. The polyester-polyurethanes generally have specific gravities in the range of from 1.15 to 1.30. The resins of the present invention would normally be considered to be an organic compound of a high molecular weight above say about 1,000, containing repeating units achieved by a process encompassing any mechanism resulting in an increase in molecular weight, and including for example, polymerization, condensation, addition graft polymerization, block polymerization, cross-linking, solvation etc., or any combination thereof. The resin or resins hereof are polymeric or resinous materials in which the extent of polymerization is insufficient to convert the material from a normally liquid state to a jelled or fully cured solid state. Such curable liquid resins include therefore, prepolymers, plastisols, A and B stage resins, latently catalyzed resins, etc. The resins are in their final cured state, that is their solid state, when any of the foregoing processes of increase in molecular weight occur and such increase is terminated either by exhaustion of reactant materials, utilization of the entire amount of cross-linking agent, removal of heat, use of chain stopping reactants, or the like. As indicated above, the final cured products are preferably elastomeric, that is, in their final cured state they possess resilience or elasticity.

It will therefore be apparent from a review of the hereinabove disclosed invention, that a pneumatic tire is conveniently produced by the centrifugal casting method by steps which do not necessitate the use of a core in the mold. Since a core is not necessary, it will be apparent that many of the disadvantages of the prior art are obviated. The expense of constructing a relatively complicated segments core is done away with along with the inconvenience and disadvantage of a workman having to manipulate the cores. It will also be apparent that with the present method the advantages of high production can be realized, which under present day conditions are an economic necessity. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making a pneumatic tire including the steps of separately casting each of the two sidewalls of the tire each of which comprises a bead portion and a tread portion, placing each of the separately cast sidewalls into a centrifugal casting mold with a portion of one sidewall at its tread portion being spaced from a portion of the other sidewall at its tread portion, introducing a curable liquid material which is compatible with the material of construction of the said sidewalls into the centrifugal casting mold and rotating said centrifugal casting mold whereby said liquid material travels to the space between said sidewalls at said tread portions to fill said space, at least partially curing said liquid material to a hardened condition to connect said two sidewalls together and removing said tire from said mold.

2. The method of making a pneumatic tire including the steps of separately centrifugally casting a liquid polyurethane material into two tire sidewalls each having a bead portion and a tread portion, placing each of the separately cast sidewalls into a centrifugal casting mold with a portion of one sidewall at its tread portion being spaced from a portion of the other sidewall at its tread portion, rotating the centrifugal casting mold and introducing a curable liquid polyurethane material thereinto which travels by centrifugal action to and fills the space between said spaced tread portions, at least partially curing the polyurethane material in said space to join said sidewalls together and removing the finished pneumatic tire from the mold.

* * * * *